No. 859,730. PATENTED JULY 9, 1907.
E. BETZ.
POISE FOR RAILWAY AND OTHER SCALES.
APPLICATION FILED JAN. 28, 1905.
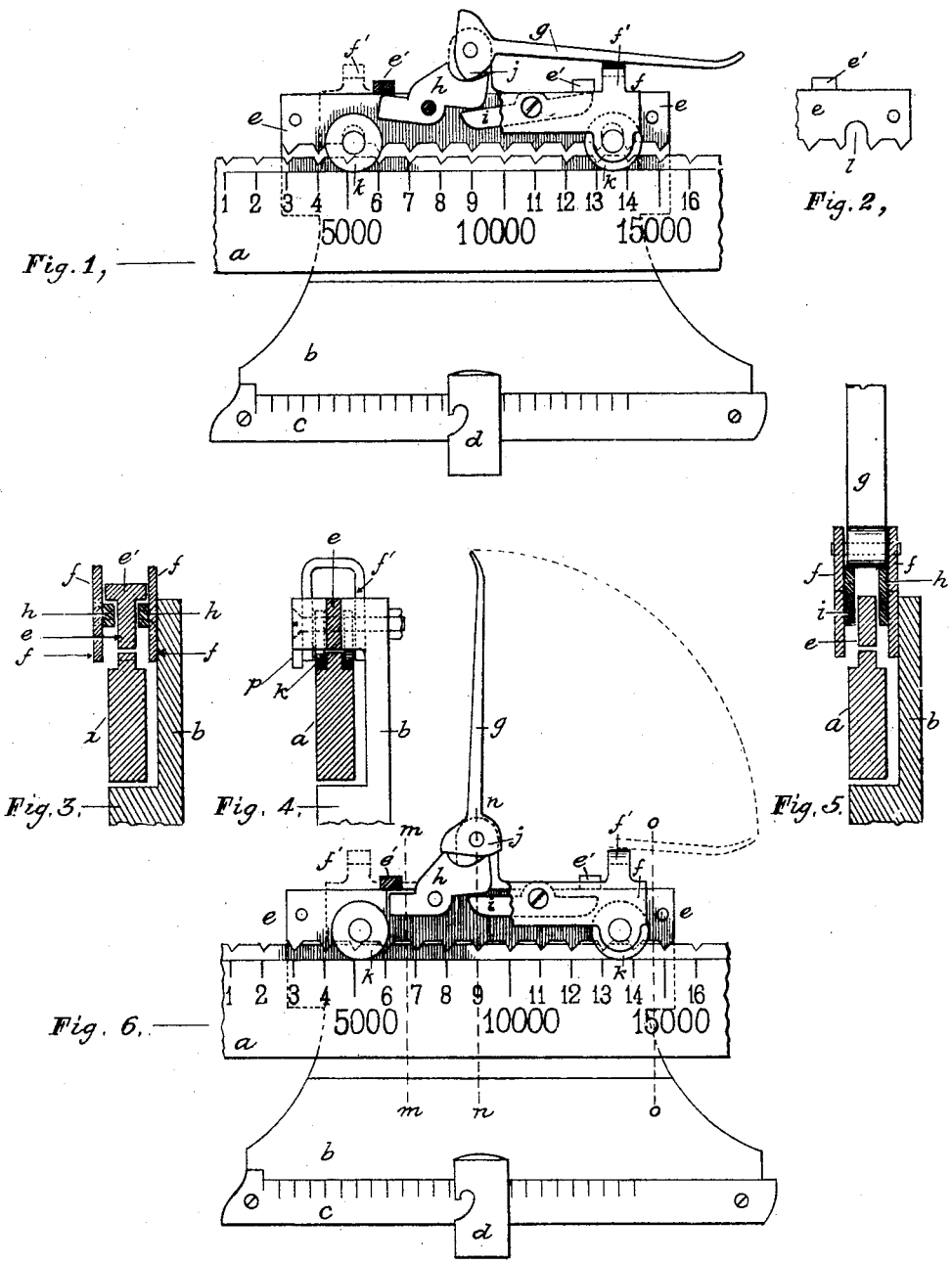

UNITED STATES PATENT OFFICE.

EUGENE BETZ, OF CHICAGO, ILLINOIS, ASSIGNOR TO THE E. AND T. FAIRBANKS AND COMPANY, OF ST. JOHNSBURY, VERMONT, A CORPORATION OF VERMONT.

POISE FOR RAILWAY AND OTHER SCALES.

No. 859,730.　　　　Specification of Letters Patent.　　　　Patented July 9, 1907.

Application filed January 28, 1905. Serial No. 243,145.

*To all whom it may concern:*

Be it known that I, EUGENE BETZ, a citizen of the United States, residing at Chicago, in the county of Cook and State of Illinois, have invented certain new and useful Improvements in Poises for Railway and other Scales, of which the following is a description, reference being had to the accompanying drawing, and to the letters and figures of reference marked thereon.

My invention relates to an improvement in poises for railway and other scales, and the object is to provide a poise having a series of engaging points with the beam notches, whereby the wear incident to the use of only one engaging point or dog is prevented.

Another object is to provide means for raising the engaging points from the beam notches, whereby the poise can be quickly moved to position as desired.

The invention consists primarily of a carriage horizontally movable on the beam, a poise supported by said carriage and having means to engage the beam, and means for moving the poise vertically to cause it to engage with the beam.

Secondly, it consists of a carriage horizontally movable on the beam, a poise supported by said carriage and having a toothed bar to engage the notches on the beam, and means for raising and lowering the poise and toothed bar to cause the latter to engage the notches on the beam.

Thirdly, the invention consists of a carriage horizontally movable on the beam, a poise having a toothed bar rigidly secured thereto, said toothed bar being supported on the carriage but vertically movable with respect thereto, and means for moving it and the poise vertically.

Finally, the invention consists in the matters hereinafter described and referred to in the appended claims.

The invention is illustrated in the accompanying drawings, in which,

Figure 1 is a front view, partly in section, of a poise embodying my invention, the front plate $p$ being removed; Fig. 2 is a detail view of a portion of the toothed bar; Fig. 3 is a cross section on line $m$—$m$, Fig. 6; Fig. 4 is a cross section on line $o$, $o$, Fig. 6; Fig. 5 is a cross section on line $n$, $n$, Fig. 6; and Fig. 6 is a view similar to Fig. 1, showing the poise in engagement with the beam.

In these drawings, the main beam is shown at $a$, the main poise at $b$, the side beam at $c$, and the side poise at $d$.

The main poise $b$ has secured to it, as shown in Fig. 4, a toothed or notched bar $e$, the teeth of which are adapted to engage the notches in the beam $a$. This bar $e$ has open slots $l$, (only one of which is shown), which rest upon the axles supporting the rollers $k$, which ride upon the beam, the axles of these rollers being journaled in bearings formed in a carriage made up of the front and rear side plates $f, f$, tied together by yokes $f', f'$. The side plates therefore, form a carriage which is horizontally movable on the beam, and as shown in Fig. 6, when the upper end of the slots $l$ rests on the axles of the rollers, the teeth or dogs on the bar $e$ engage the notches on the beam.

To permit of sliding the poise, I have provided a means for raising the toothed bar and poise to raise the former from engagement with the beam notches. A handle $g$, having a cam $j$, on its lower end, is pivoted to the carriage or side plates $f, f$, and the cam engages tumblers $h$, pivoted to one set of side plates, which tumblers $h$ in turn engage tumblers $i$, pivoted to the other set of side plates, both sets of tumblers at their opposite ends being adapted to engage the cross pieces $e'$ on the toothed bar $e$.

By turning down the handle from the position shown in Fig. 6 to that shown in Fig. 1, the toothed bar $e$ is raised vertically, and with it the poise, off the axles of the rollers $k$, leaving the carriage and poise free to roll horizontally on the beam.

It will be seen by my construction, that the so-called carriage and poise proper, make up the complete poise which may be operated when the handle is in the position shown in Fig. 1, without touching the handle at all, the same as any sliding poise, thus not exerting the weight of the hand on the poise, as is customary in railroad poises, and thereby getting an approximate balance much more readily.

Various minor modifications and changes may be made without departing from the spirit of my invention.

Having thus described my invention, what I claim as new and desire to secure by Letters Patent, is:—

1. In combination with the beam, a poise comprising a carriage horizontally movable on the beam, said carriage having supporting rollers adjacent each end thereof a poise proper supported by said carriage and having means to engage the beam, and means for moving the poise proper, vertically to cause it to engage with and be released from the beam; substantially as described.

2. In combination with the beam, a poise comprising a carriage horizontally movable on the beam, a poise proper supported by said carriage but vertically movable with respect thereto, to engage and disengage the beam, and means for imparting said vertical movement to said poise proper, said means comprising a cam pivoted to the carriage, and connections between said cam and the poise for raising the latter; substantially as described.

3. In combination with the beam, a poise comprising a carriage horizontally movable on the beam, a poise proper supported by said carriage but vertically movable with respect thereto, to engage and disengage the beam, and means for imparting said vertical movement to said poise proper, said means comprising a cam pivoted to the carriage and levers also pivoted to the carriage and operatively engaging the cam and the poise proper; substantially as described.

4. In combination with the notched beam, a poise comprising a carriage horizontally movable on the beam, a poise proper supported by said carriage and having a toothed bar extending the entire length of said carriage to engage a plurality of notches on the beam, and means for raising and lowering the poise and toothed bar to cause the latter to engage with or be disengaged from the notches on the beam; substantially as described.

5. In combination with the notched beam, a poise comprising a carriage horizontally movable on the beam, a poise proper having a toothed bar rigidly secured thereto, said toothed bar having a vertical sliding engagement with the carriage, and means for moving it vertically; substantially as described.

6. In combination with the beam, a poise comprising a carriage supported on rollers traveling on said beam, and a poise proper having means to engage said beam and having vertical slots embracing the axles of the rollers, said carriage being provided with a pivoted cam and pivoted levers operated thereby, said pivoted levers also engaging the poise proper; substantially as described.

7. In combination with the beam, the poise comprising a carriage having rollers traveling on the beam, a poise proper, a toothed bar secured to said poise and having vertical slots embracing the axles of the rollers, whereby vertical movement of the toothed bar and poise, with respect to the carriage is permitted, and means on the carriage for raising toothed bar and poise vertically; substantially as described.

8. In combination with the beam, the poise comprising a carriage having rollers traveling on the beam, a poise proper, a toothed bar secured to said poise and having vertical slots embracing the axles of the rollers, whereby vertical movement of the toothed bar and poise with respect to the carriage is permitted, said toothed bar being provided with cross pieces, a cam lever and tumblers operated thereby, and all pivoted to the carriage, said tumblers also operatively engaging the cross pieces; substantially as described.

In testimony whereof I affix my signature, in presence of two witnesses.

EUGENE BETZ.

Witnesses:
H. J. ROBINS,
F. E. CHURCH.